United States Patent [19]

Held

[11] Patent Number: 5,087,319
[45] Date of Patent: Feb. 11, 1992

[54] APPARATUS FOR CONTINUOUS MANUFACTURE OF LAMINATES

[76] Inventor: Kurt Held, Alte Strasse 1, D-7218 Trossingen 2, Fed. Rep. of Germany

[21] Appl. No.: 540,359

[22] Filed: Jun. 19, 1990

[30] Foreign Application Priority Data

Jun. 27, 1989 [DE] Fed. Rep. of Germany ....... 3920946

[51] Int. Cl.$^5$ .......................... B32B 31/00; B24B 55/02
[52] U.S. Cl. .................................... 156/555; 156/580; 51/74 R; 51/87 R; 51/266; 51/356; 165/80.5; 165/133
[58] Field of Search ............ 156/555, 324, 580, 583.1; 100/93 RP; 51/87 R, 74 R, 266, 356, 141; 165/2, 80.5, 76, 133, 914

[56] References Cited

U.S. PATENT DOCUMENTS

| | | | |
|---|---|---|---|
| 3,916,579 | 11/1975 | Waller et al. | 51/356 X |
| 3,918,220 | 11/1975 | Jury et al. | 51/356 X |
| 4,557,778 | 12/1985 | Held | 156/209 |
| 4,608,037 | 8/1986 | Flemming, III | 51/74 R X |
| 4,657,068 | 4/1987 | Peltz | 51/266 X |
| 4,662,121 | 5/1987 | Ginter | 51/266 X |
| 4,750,914 | 6/1988 | Chikaoka et al. | 51/293 |
| 4,755,252 | 7/1988 | Held | 156/555 X |
| 4,776,862 | 10/1988 | Wiand | 51/293 |

FOREIGN PATENT DOCUMENTS

| | | |
|---|---|---|
| 0046604 | 3/1982 | European Pat. Off. . |
| 0092745 | 11/1983 | European Pat. Off. . |
| 0113823 | 7/1984 | European Pat. Off. . |
| 0215392 | 3/1987 | European Pat. Off. . |
| 0259916 | 3/1988 | European Pat. Off. . |
| 3300860 | 11/1983 | Fed. Rep. of Germany . |
| 3247146 | 3/1984 | Fed. Rep. of Germany . |
| 1294735 | 12/1962 | France . |

Primary Examiner—David A. Simmons
Assistant Examiner—J. Sells
Attorney, Agent, or Firm—Toren, McGeady & Associates

[57] ABSTRACT

The invention is directed to an apparatus for continuous fabrication of laminates comprising several layers of at least partially resin impregnated material webs which are extruded together. The material webs are taken off supply coils in the take off units and are subsequently stacked upon each other. The stacked material webs are then extruded into a laminate web in a double band press with application of area pressure and possibly heat. The laminate web is subsequently further processed in a grinding and cooling arrangement located downstream of the double band press, which consists of a grinding station and cooling station combined into one single device. Downstream of the grinding and cooling arrangement is a reel up arrangement for winding the laminate web upon supply coils or a transverse cutting station for subdivision of the laminate web into plates or panels.

18 Claims, 3 Drawing Sheets

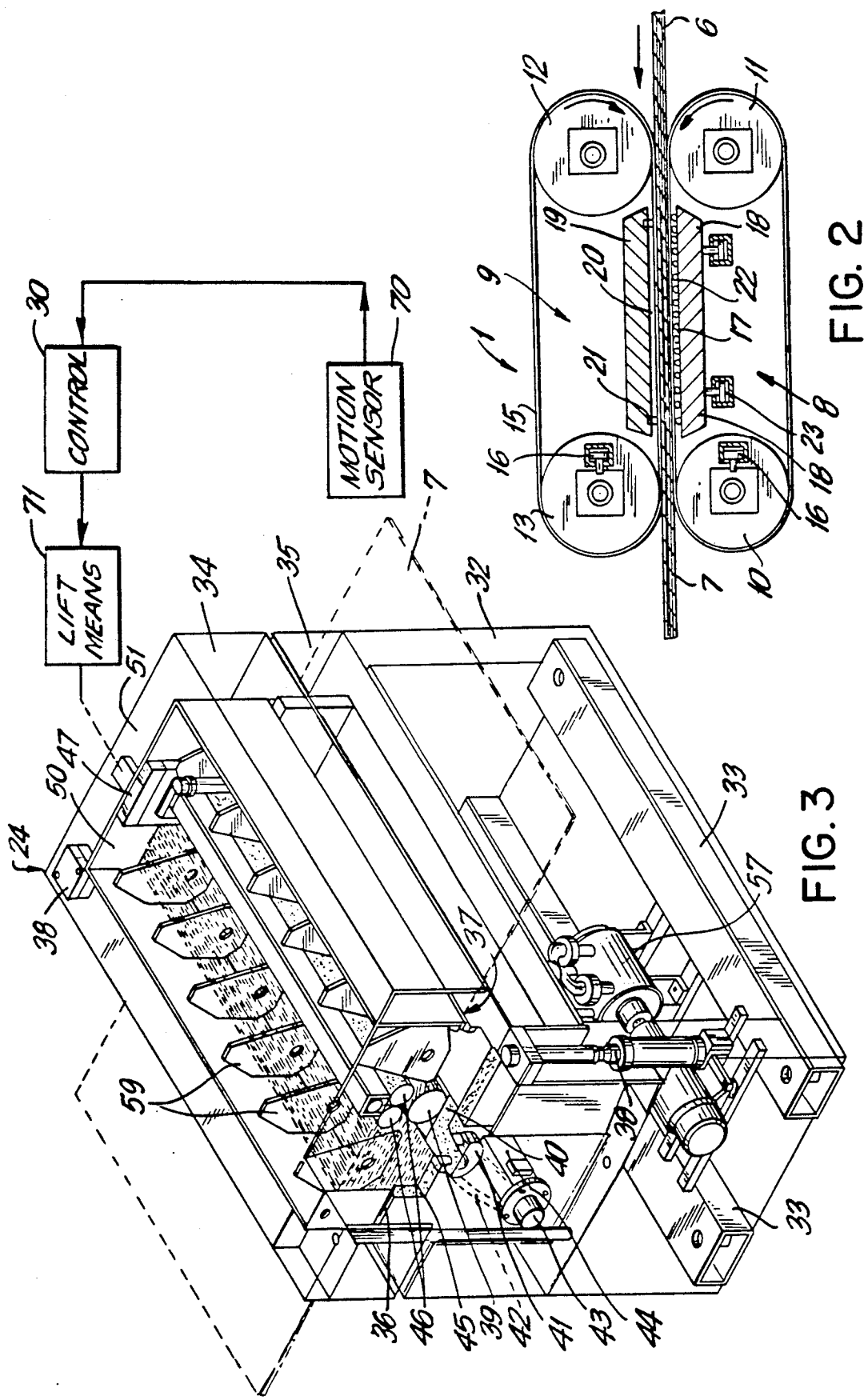

APPARATUS FOR CONTINUOUS MANUFACTURE OF LAMINATES

The invention is directed to an apparatus for the continuous manufacture of laminates.

BACKGROUND OF THE INVENTION

Laminates are layered materials consisting of several layers of material webs impregnated with duroplastic or thermoplastic resins, which are stacked upon each other in the desired sequence and are extruded together. Fiber or tissue webs are used as material webs. For impregnation by duroplastic resins, melamine-, urea-, phenolic-, epoxy-resins or the like are, for instance, utilized. While duroplastic resins cure or harden through the application of heat or by a chemical reaction, thermoplastic resins cure by cooling.

An example of such layered materials is decorative laminates, which are used for surface coating of chipboard. These decorative laminates consist of a core and surface layer, which is again composed of melamine or phenolic resin impregnated papers. The surface layer resting upon the core layer is herein provided with a decorative printing, for instance, with imitation wood graining.

Continuous processes are increasingly used for fabrication of laminates, since these provide an increased quantity as well as quality compared with discontinuous processes. A continuously working apparatus for fabrication of decorative laminates is known from DE-OS 32 47 146. The apparatus shown there consists of a double band press, upstream of which several take off units are arranged. Storage coils are located in the take off units, from which the resin impregnated material webs are taken off and are combined or stacked into a layered formation. This layered formation enters into a double band press and is extruded there into a laminate web with the application of area pressure and possibly heat. The double band press is followed downstream by a cooling arrangement utilizing a water spray, where the laminate web is cooled. Subsequently, the back side of the laminate web is roughened downstream in a grinding station in order to assure an improved glueability or adhesion of the decorative laminate upon a carrier plate. A laminate web treated in such a way is then wound in a reel-up arrangement upon a storage coil or is subdivided into panels or plates in a transverse cutting station. The grinding station can herein be equipped with diamond tipped round brushes.

It is disadvantageous in this known apparatus that, especially with high production and also higher feed velocities of the laminate webs, there occurs too high generation of heat at the ground surface, which leads to unsightly surfaces having poor mechanical properties. In case of sensitive laminates, this can even lead to increased waste. An additional disadvantage is that the grinding brushes are very quickly loaded with grinding dust from the laminate surface, so that these grinding brushes must be replaced relatively often. The laminate fabrication must, however, be interrupted when this is done, so that these frequent down times lead overall to a reduction of the output of the continuously working installation. Apart from this, increased expense for maintenance is involved.

SUMMARY OF THE INVENTION

The invention has as its principal object improvement of apparatus for continuous fabrication of laminates in such a way that it becomes suitable for the fabrication of laminates with improved surface qualities at higher production speeds and with less down time because of required maintenance.

Briefly speaking, this is achieved according to the invention by integrating the cooling and grinding stations. Preferably, the apparatus is arranged such that the grinding of the laminate surface takes place simultaneously while it is cooled. In a preferred embodiment, the grinding means and laminate are submerged within the cooling medium.

In accordance with another feature of the invention, the apparatus is provided with an internal tub, containing cooling water for the laminate web, as well as a grinding brush rotatably supported in the cooling water. As a result, the grinding dust is dissolved in the cooling water and the loading-up of the surface of the grinding brush with grinding dust is thus effectively prevented. The grinding dust is conveyed out of the apparatus together with the cooling water and is collected in a filter. Further, by maintaining the grinding dust and the cooling arrangement of the apparatus in the invention at a pressure lower than atmospheric, flow of the cooling water out of the apparatus is effectively prevented.

In accordance with a further feature of the invention, a grinding brush operating with particular efficiency is described, consisting of a cylindrically shaped hollow roller. Helically shaped grooves and lands alternate upon the outer contoured surface of the hollow roller, with the lands provided with diamonds. In order to prevent grinding through the laminate web when using such an efficiently working grinding brush during down time, a motion sensor for the laminate web can be installed in the apparatus so that when the laminate web stops, a signal of the motion sensor triggers a lifting of the laminate web off the grinding brush.

Because of the integration of the grinding station and the cooling station in the invention into a single device, the overall length of the the apparatus for continuous fabrication of decorative laminates is advantageously shortened, and simultaneously the costs of fabrication of this device are reduced. The other advantages obtained through the invention consist especially in that damage to the surface of the laminate web due to frictional heat is prevented, also with higher production speeds when grinding. Since the grinding brush can be completely surrounded by cooling water, there results slight or even no wear at all of these grinding brushes. A loading up of the grinding brush by grinding dust is thereby effectively prevented, so that the frequency of maintenance of these grinding brushes is greatly reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

In the drawings:

FIG. 2 is a schematic diagram of a double band press in a sectional view;

FIG. 3 is a perspective view of a grinding and cooling arrangement according to the invention partially sectioned and partially with the housing cut open;

DETAILED DESCRIPTION OF THE PREFERRED EMBODIMENTS

Figure 1:
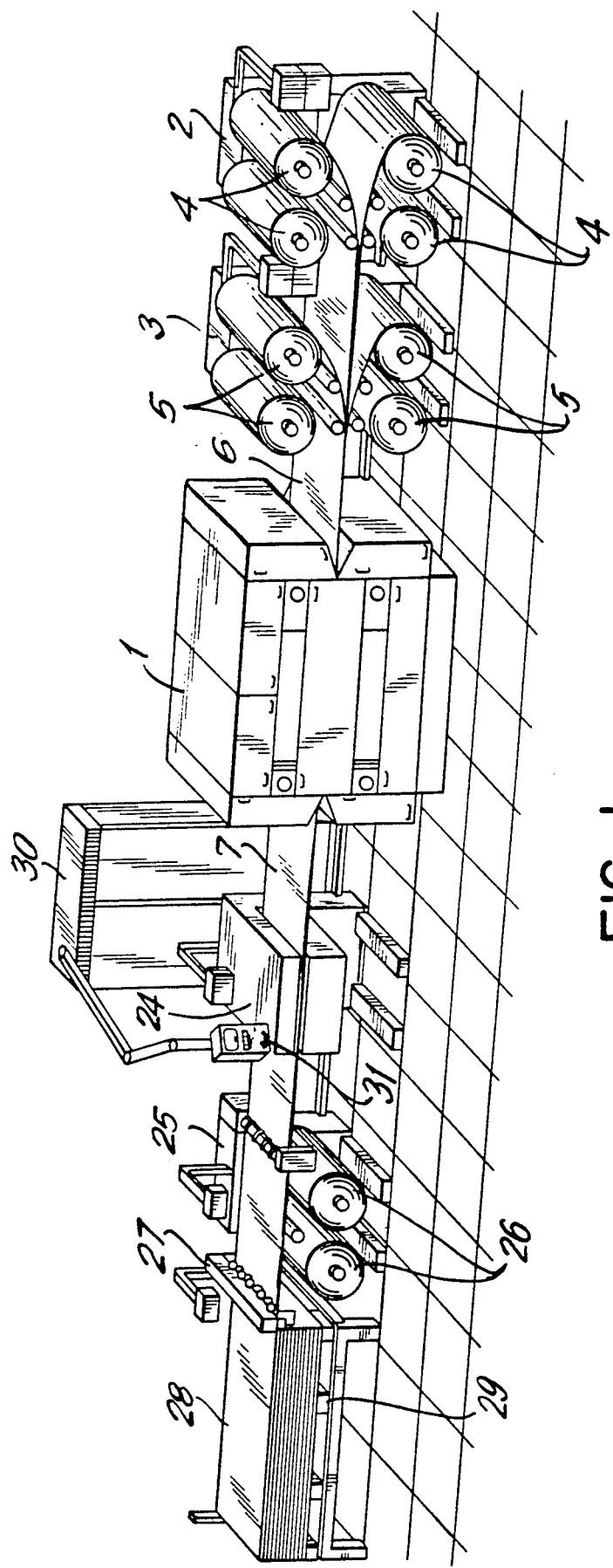
FIG. 1 is an overall view of an apparatus according to the invention for continuous fabrication of laminates.

FIG. 1 shows an apparatus according to the invention for continuous fabrication of decorative laminates. It comprises a double band press 1 with several aggregates arranged upstream and downstream of it. Take off units 2, 3 with storage coils 4, 5 installed therein are located upstream of the double band press 1. The storage coils 4, 5 contain the paper webs impregnated with a precondensed duroplastic resin as an example, with a decorative layered material being composed of these paper webs. The resin impregnated paper webs are continuously taken off the storage coils 4, 5 and are combined upstream of the double band press 1 into a layered formation 6. This layered formation 6 then enters into the double band press 1 and is there continuously cured or hardened with application of heat and area pressure into a decorative laminate web 7.

FIG. 2 shows the continuously operating double band press 1 in more detail. It comprises a lower press band unit 8 and an upper press band unit 9, which are superimposed. The press band units 8, 9 are composed of two reversing drums 10, 11 or 12, 13 each with one endless press band 14, 15 which is conducted around the reversing drums 10, 11 or 12, 13 and is stretched or tensioned by means of hydraulic cylinders 16. The four reversing drums 10, 11 or 12, 13 are rotatably supported in a press stand not shown in the drawings for reasons of clarity. At least, respectively, one reversing drum of both press band units 8, 9 is driven so that the two press bands 14, 15 move according to the arrows in the reversing drums 11, 12. A reaction zone 17 is located between the lower band segment of the upper press band 15 and the upper band segment of the lower press band 14, in which reaction zone the layered formation 6 advancing in the drawing from right to left is extruded with simultaneous passage through the double band press 1. The area pressure exerted upon the layered formation 6 in the reaction zone 17 of the double band press 1 is hydraulically or mechanically applied upon the inner sides of the press band 14, 15 and is then transmitted from the press bands 14, 15 to the layered formation 6 to be extruded. The reaction forces emanating from the layered formation 6 are then reintroduced into the press stand through the pressure plates 18, 19.

In case of hydraulic pressure transmission, a fluid pressure medium which can be pressurized is introduced into the space between the pressure plate 19 and the inner side of the press band 15, as is seen in FIG. 2 at the example of the upper press band unit 9. This so-called pressure chamber 20 is bounded on the side by a floating seal 21 closed annularly within itself, fastened in the pressure plate and sliding on the inner side of the press band 15. Preferably a synthetic oil is used as the pressure medium. However, a gas such as compressed air can be used equally well.

Stationary rollers 22 are arranged between the pressure plate 18 and the inner side of the press band 14 for generating the mechanical area pressure acting upon the layered formation 6 as shown in FIG. 2 at the example of the lower press band unit 8. The pressure plate 18 together with the rollers 22 is applied against the inner side of the press band 14 by means of hydraulic cylinders 23.

Of course, the pressure plate 19 can also be equipped with a mechanical pressure transmission system or the pressure plate 18 with a hydraulic pressure system. If desired, the pressure transmission can occur by combining hydraulic and mechanical means, thus using the two described principles simultaneously.

If the layered formation 6 requires heat for curing, the pressure plate 18, 19 can be configured as a heating plate. The heat is then transmitted from the pressure plate 18, 19 by means of rollers 22 or by means of heat conducting elements to the press band 14, 15 and from there to the layered formation 6 in the reaction zone 17. The design of such heat conducting elements is known as such and can occur according to DE-OS 33 25 578. The pressure plates 18, 19 of the double band press 1 can also be divided into a heating and cooling zone, so that the layered formation 6 is already cooled in the double band press 1 itself under the effect of the pressure.

As can be seen in FIG. 1, the laminate web 7 leaves the double band press 1 after being extruded with a uniform velocity and passes subsequently through a grinding and cooling arrangement 24, which in the invention is combined into a single device. After that, the laminate web 7 is wound in a reel-up unit 25 upon storage coils 26. Alternatively, the laminate web 7 can also be subdivided into individual plates 28 in a transverse cutting station 27 which are then stacked on pallets 29 to be transported away.

The entire process sequence of the installation shown in FIG. 1, thus with the take off of the resin impregnated paper webs, the presetting of the process parameters in the double band press 1 and in the grinding and cooling arrangement 24 and the keeping of these parameters constant as well as the subdivision of the laminate web 7 into individual plates 28, is controlled by a computer arranged in a control cabinet 30. A data terminal 31 is used by the operator for loading the process parameters. Naturally, the computer in the control cabinet 30 can also be connected to an external host or central computer, which is for instance located in the central electronic data processing unit, in order to enable controlling the production an feedback of the production data for further evaluation directly by the central unit.

In the device of the invention, the grinding and cooling of the laminate web 7 occurs simultaneously in the grinding and cooling arrangement 24. The design of this grinding and cooling arrangement 24 is shown in more detail in perspective view in FIG. 3, wherein the housing is partially shown cut open in order to expose the parts located inside in more detail.

The grinding and cooling arrangement 24 has a stand or support 32 with pedestals 33. A tub-shaped housing lower portion 35 and, on top of it, a housing upper portion 34, are arranged on the stand 32. An inner tub 50 is located inside of the housing upper portion 34 and the housing lower portion 35, which is surrounded by the outer tub 51 formed by the housing. The housing upper portion 34 sits by means of a seal 36 upon the housing lower portion 35 and thus seals the inner tub 50 against the outside environment. The housing upper portion 34 can be lifted off the housing lower portion 35 by a cylinder piston unit 38 in order to perform maintenance. The laminate web 7 passes into the inner tub 50 of the grinding and cooling arrangement 24 through an inlet and outlet gap 37 between the housing upper portion 34 and the housing lower portion 35. In the course of it, the laminate web 7 slides along the seal 36 in the housing upper portion 34 and the housing lower portion 35, so that the inlet and outlet gap 37 of the grinding and cooling arrangement 24 is sealed against the external ambient.

A grinding means or brush 39, circular in cross-section and equipped with diamonds, is arranged in the inner tub 50 of the housing lower portion 35. As can be seen in better detail in FIG. 6, the grinding brush 39 comprises a cylindrical hollow roller 60 with axis stubs 40, 40' welded to both its ends. By means of these axis stubs 40, 40' the grinding brush 39 is rotatably supported in the walls 45 of the inner tub 50 (see FIG. 3). The axis stub 40 attached to the front side of the grinding brush 39 protrudes through the wall 45 in the tub 50 into the outer tub 51. A pinion 41 is attached to the axis stub 40 in the outer tub 51. A motor 44 is located in the stand 32, upon whose shaft sits a driving gear wheel 43. A toothed belt 42 is stretched over the drive gear wheel 43 and the pinion 41 so that the motor 44 causes the grinding brush 39 to rotate. For better clarity of this arrangement, the wall 45 as well as the pinion 41 and the axis stub 40 are shown to be cut open in FIG. 3.

Figure 4:
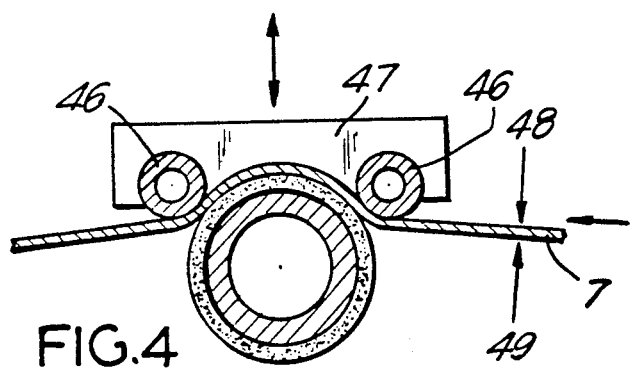
FIG. 4 is a cut-out of FIG. 3 at a larger scale showing the functional mode of the grinding brush.

The guidance of the laminate web 7 in the inner tub 50 of the grinding and cooling arrangement 24 can be seen in more detail in the diagrammatic sketch in FIG. 4. Two back-up rollers 46 are rotatably supported in a bearing block 47 arranged in the housing upper portion 34. These back-up rollers 46 are located above the grinding brush 39 in its immediate vicinity. The bearing block 47 is adjusted in such a way that the back-up rollers 46 touch the front side 48 of the laminate web 7 and at its rear side apply a contact pressure to a portion of the circumference of the grinding brush 39. The back-up rollers 46, being idlers, do not require any drive, since they are turned due to the motion of the laminate web 7. The bearing block 47 can be advanced or backed off in the direction of the arrow, meaning perpendicularly to the laminate web 7, in order to be able to thus adjust the contact pressure of the back-up rollers 46 upon the laminate web 7.

Grinding of the rear side 49 of the laminate web 7 by means of the diamond equipped grinding brush 39 is very effective and can be performed at higher speeds than possible hitherto. This enables an additional increase in output of the entire apparatus for fabrication of laminates. In order to however prevent grinding through the laminate when the laminate web is stationary, which can occur during down time, the bearing block 47 can be moved in a direction away from the grinding brush 39, whereby the contact pressure of the back up rollers 46 is removed and the rear side 49 of the laminate web 7 is lifted off the grinding brush 39. For automation purposes, a motion sensor 70 (FIG. 3) can be provided responsive to the laminate web 7 movement, which signals a stationary state of the laminate web 7 to the computer in the control cabinet 30 which, on its part, triggers the lift-off 71 of the back-up rollers 46 in the bearing block 47 from the laminate web 7.

During the grinding process of the rear side 49, the laminate web 7 is at the same time cooled in the grinding and cooling arrangement 24. For this purpose, cooling water is provided in the inner tub 50. As can be seen in FIG. 3, the inside tub 50 is filled with cooling water to a level so that the front side 48 as well as the rear side 49 of the laminate web 7 is completely covered by cooling water. A leakage of the cooling water out of the inside tub 50 is prevented by the seal 36. However, slight quantities of cooling water can escape from the inside tub 50 due to leakage, as well as also being carried along by the moving laminate web 7 when passing through the seal 36. Such splash water is caught by the outer tub 51 and is collected there, so that an escape of cooling water from the grinding and cooling arrangement 24 is effectively prevented.

Figure 5:
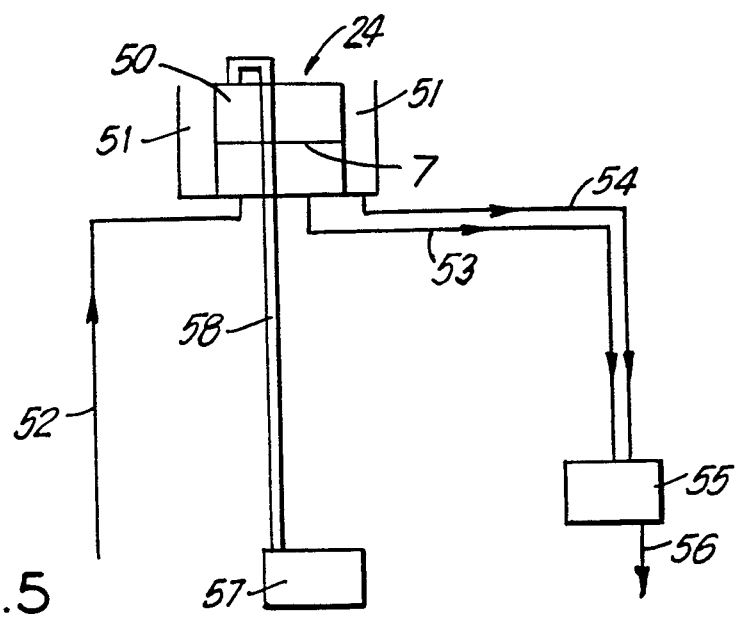
FIG. 5 is a basic schematic diagram showing the function of the grinding and cooling arrangement according to the invention.

A diagrammatic sketch in FIG. 5 explains the operational mode of the grinding and cooling arrangement 24 in more detail. Fresh cooling water is conveyed through a cooling water supply line 5 into the inside tub 50 of the grinding and cooling arrangement 24. Cooling water can be drawn out of the inner tub 50 by means of a cooling water return line 53. By regulating the supply in the cooling water supply line 52 and the drainage in the cooling water return line 53, the temperature as well as the level of the cooling water in the inner tub 50 can be maintained constant, in order thus to achieve an optimum cooling of the laminate web 7. The cooling water leakage collected in the outer tub 51 is conveyed away through a splash water return line 54.

The grinding dust generated by grinding the rear side 49 of the laminate web 7 is floated away by the cooling water from the rear side 49 of the laminate web 7 and the grinding brush 39. This grinding dust dissolved in the cooling water is transported together with the waste water in the cooling water return line 53 and the splash water return line 54 to a filter 55, into which the cooling water return line 53 and the splash water return line 54 discharge. The filter 55 separates the grinding dust out of the waste cooling water. The purified cooling water is then conveyed from the filter 55 into a channel supply line 56. Prior to that, this water can pass additionally through a heat exchanger in order to regain the heat absorbed during cooling of the laminate web 7.

In order to keep the quantity of the splash water collected in the outer tub 51 as small as possible, a slight vacuum is applied to the inner tub 50. For this purpose, a vacuum pump 57 is arranged in the stand 32 of the grinding and cooling arrangement 24, as can be seen in FIGS. 3 and 5. A connecting line 58 leads from this vacuum pump 57 to the inner tub 50 in the housing upper portion 34. Because of the air aspirated away by the vacuum pump 57 through the connecting line 58, the pressure in the inner tub 50 is slightly below that of the outer tub 51. This lower pressure prevents an escape of the cooling water from the inner tub 50 into the outer tub 51. Ribs 59 are arranged in the inner tub 50 as can be seen in FIG. 3, for stiffening the inner tub 50 which is subject to a vacuum.

Basically, any conventional grinding brush comprising bristles is suitable to act as the grinding means 39 for grinding or roughening the rear side 49 of the laminate web 7 in the grinding and cooling arrangement 44 according to the invention. The brush can also carry hard material, for instance, cubic boron nitride. Grinding brushes equipped with diamonds have been found to be particularly effective, having higher useful life as well as permitting a higher feed velocity of the laminate web 7 in the grinding and cooling arrangement 24. The utilization of higher feed velocities when working the rear side 49 of the laminate web 7 by means of a diamond equipped grinding brush 39 was first made possible by the inventive simultaneous cooling when grinding the laminate web 7, since this permits a secure removal of the frictional heat, which again effectively prevented damaging the laminate surface by the arising frictional heat.

Figure 6:
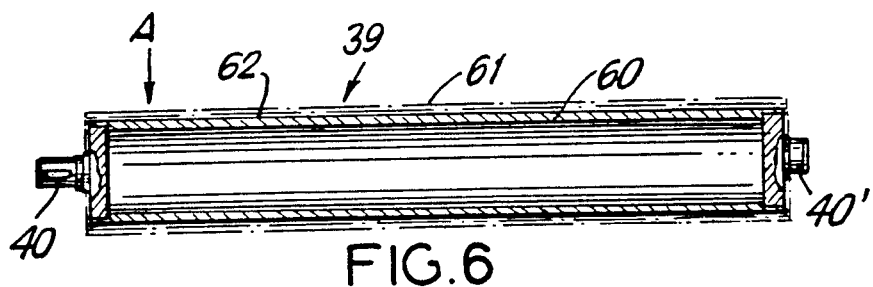
FIG. 6 is a longitudinal section through a grinding brush for use in the apparatus of FIG. 1.
Figure 7:
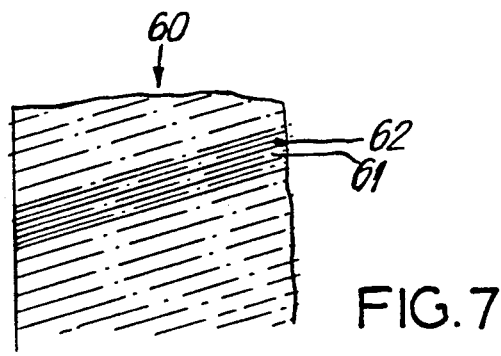
FIG. 7 is a cut-out from the surface of the grinding brush.

An especially preferred version of the grinding brush 39 is seen in FIG. 6 in more detail. It consists of a cylindrically shaped hollow roller 60 with groove 62 being placed into its surface, which winds helically around the jacket of the cylindrically shaped surface of the hollow roller 60. A portion of the surface of the hollow roller 60 is shown in FIG. 7 in plan view corresponding to the direction A in FIG. 6. As can be seen there, lands 61 and grooves 62 extending in a helical manner alternate upon the surface of the hollow roller 60. The lands 61 are equiped with diamonds which perform the grinding action proper on the rear side 49 of the laminate web. Through the helically shaped arrangement of the lands 61 and the grooves 62 there results on the one hand a completely uniform grinding effect upon the rear side 49 of the laminate web 7 and on the other hand a uniform cooling action by the cooling water carried in the grooves 62. The grinding dust arising due to the grinding action is received from the surface of the laminate 7 in the grooves 62 and is flushed out of these to the side by the motion of the cooling water in the helical turns and is finally separated out in the filter 55 together with the cooling water removed through the cooling water return line 53 (see FIG. 5).

The attachment of the diamonds to the lands 61 can be achieved by binding diamond dust galvanically upon the surface of the lands 61. Another possibility consists of soldering or welding a diamond compound layer upon the lands 61. Such a diamond compound layer consists of diamond particles oriented randomly in a metal matrix which fuse together into a mass with application of extremely high temperatures and pressures.

The apparatus of the invention has been described with the example of fabrication of decorative laminates. It can, however, be used for fabricating any type of laminate. It is evident that a synergistic effect is created by the described combination of the grinding and cooling process in one single device and, because of this, the fabrication speed of the apparatus for continuous fabrication of laminates can be overall increased. This provides an additional increase of the production output of this apparatus, which was impossible to achieve in previously known devices.

While the invention has been described in connection with preferred embodiments, it will be understood that modifications thereof within the principles outlined above will be evident to those skilled in the art and thus the invention is not limited to the preferred embodiments but is intended to encompass such modifications.

I claim:

1. Apparatus for continuous fabrication of laminate comprising several layers of at least partially resin impregnated material webs which are extruded together with each other, comprising means for supplying stack material webs, a double-band press for receiving the stacked material webs and extruding same into a laminate web using at least area pressure, a cooling station arranged downstream of the double-band press where the laminate web is cooled, a grinding station arranged downstream of the double-band press where the rear side of the laminate web is roughened, and downstream of the cooling and grinding means for winding the laminate web on storage coils or for sub-dividing the laminate web into plates or panels, characterized in that the grinding station is combined with the cooling station in one single device into an integrated grinding and cooling arrangement, the grinding and cooling arrangement including a support, a housing on the support having an upper portion and a lower portion, an inner tub in the housing upper portion and lower portion, sealing means for substantially sealing off from the outside the housing upper and lower portions, inlet and outlet gaps between the housing upper and lower portions and leading into the inner tub for the laminate web, cooling water in the inner tube, and grinding means rotatably supported in the inner tub and positioned such that the rear side of the laminate web is conveyed so as to contact the surface of the grinding means, the housing upper portion and lower portion forming an outer tub surrounding the inner tub, said outer tub serving for receiving cooling water leaking from the inner tub.

2. Apparatus according to claim 1, wherein said supplying means comprises plural storage coils for the material webs and means for taking off from the storage coils and stacking a plurality of said material webs, and the double band press includes means for applying heat to the stacked webs.

3. Apparatus according to claim 1, further comprising a bearing block with back-up rollers rotatably supported therein and arranged in the housing upper portion such that the back-up rollers rest on the front side of the laminate web and cause the rear side of the laminate web to be pressed into contact with the grinding means surface.

4. Apparatus according to claim 3, wherein the bearing block is movable perpendicularly to the laminated web plane for selectively applying contact pressure of the back-up rollers to the laminate web.

5. Apparatus according to claim 4, further comprising means for sensing motion of the laminate web and in response to no motion of the web moving the bearing block to remove the contact pressure.

6. Apparatus according to one of claim 1, further comprising connected to the inner tub cooling water supply and return lines, connected to the outer tub a splash water return line, and filter means connected to the cooling water return line and splash water return line for separating grinding dust from the cooling water.

7. Apparatus according to claim 6, further comprising a vacuum pump located in said support of the grinding and cooling arrangement, and means for connecting the pump to the inner tub for reducing the pressure in the inner tub compared with that in the outer tub.

8. Apparatus according to claim 7, wherein the inner tub comprises ribs for stiffening purposes.

9. Apparatus according to claim 1, wherein the grinding means comprise a cylindrical member having on its surface helically shaped grooves forming alternate grooves and lands on said surface.

10. Apparatus according to claim 9, wherein the lands of the grinding means are provided with hard materials.

11. Apparatus according to claim 10, wherein the hard material is cubic boron nitride.

12. Apparatus according to claim 9, wherein the lands of the grinding means are provided with diamonds.

13. Apparatus according to claim 12, wherein the lands are equipped with diamonds by binding diamond powder galvanically to the surface of the lands.

14. Apparatus according to claim 12, wherein a diamond composite layer is applied to the lands consisting of diamond particles sintered into a metal matrix at high pressure and temperature.

15. Apparatus according to claim 14, wherein the diamond composite layer is applied into the lands by means of welding.

16. Apparatus according to claim 14, wherein the diamond composite layer is applied to the lands by hard soldering.

17. Apparatus for continuous fabrication of laminate comprising several layers of at least partially resin impregnated material webs which are extruded together with each other, comprising means for supplying stack material webs, a double-band press for receiving the stacked material webs and extruding same into a laminate web using at least are pressure, a cooling station arranged downstream of the double-band press where the laminate web is cooled, a grinding station arranged downstream of the double-band press where the rear side of the laminate web is roughened, and downstream of the cooling and grinding means for winding the laminate web on storage coils or for sub-dividing the laminate web into plates or panels, characterized in that the grinding station is combined with the cooling station in one single device into an integrated grinding and cooling arrangement, the grinding and cooling arrangement including a support, a housing on the support having an upper portion and a lower portion, an inner tub in the housing upper portion and lower portion, sealing means for substantially sealing off from the outside the housing upper and lower portions, inlet and outlet gaps between the housing upper and lower portions and leading into the inner tub for the laminate web, cooling water in the inner tub, and grinding means rotatably supported in the inner tub and positioned such that the rear side of the laminate web is conveyed so as to contact the surface of the grinding means, the grinding means comprising a cylindrical hollow roller with axis stubs secured to both its ends, said grinding means being rotatably supported by means of these axis stubs in the walls of the inner tub, one axis stub protruding through the wall of the inner tub into the outer tub, and further comprising a pinion fastened to the axis stub in the outer tub, a motor arranged in the support and having on its shaft a drive gear wheel, a toothed belt stretched over the drive gear wheel and the pinion whereby the motor turns the grinding means.

18. Apparatus for continuous fabrication of laminate comprising several layers of at least partially resin impregnated material webs which are extruded together with each other, comprising means for supplying stack material webs, a double-band press for receiving the stacked material webs and extruding same into a laminate web using at least are pressure, a cooling station arranged downstream of the double-band press where the laminate web is cooled, a grinding station arranged downstream of the double-band press where the rear side of the laminate web is roughened, and downstream of the cooling and grinding means for winding the laminate web on storage coils or for sub-dividing the laminate web into plates or panels, characterized in that the grinding station is combined with the cooling station in one single device into an integrated grinding and cooling arrangement, the grinding and cooling arrangement including a support, a housing on the support having an upper portion and a lower portion, an inner tub in the housing upper portion and lower portion, sealing means for substantially sealing off from the outside the housing upper and lower portions, inlet and outlet gaps between the housing upper and lower portions and leading into the inner tub for the laminate web, cooling water in the inner tub, and grinding means rotatably supported in the inner tub and positioned such that the rear side of the laminate web is conveyed so as to contact the surface of the grinding means, and further comprising lifting means for lifting the housing upper portion off of the housing lower portion.

* * * * *